Figure 1:
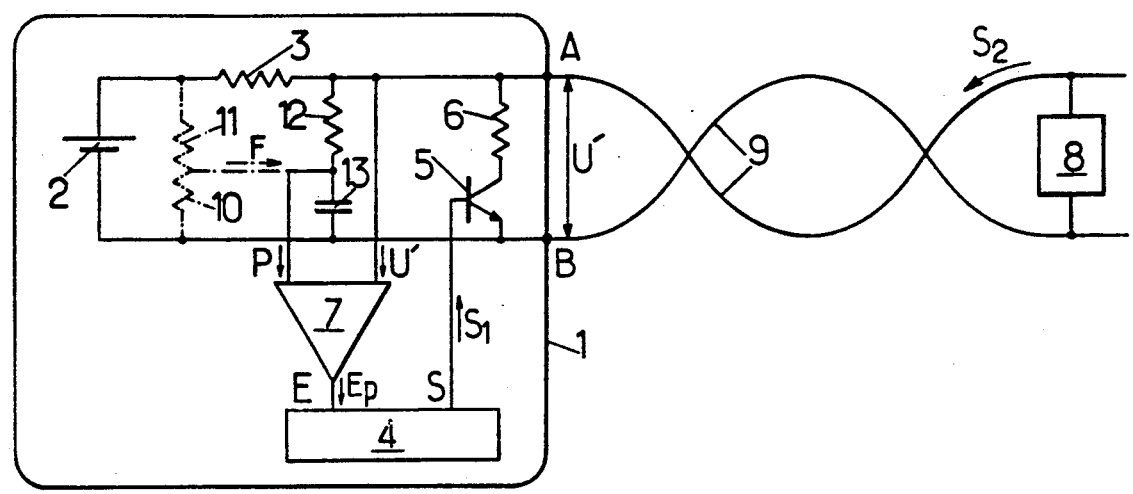

United States Patent [19]

Lewiner et al.

[11] Patent Number: 5,014,050
[45] Date of Patent: May 7, 1991

[54] ELECTRONIC INTERROGATION CIRCUITS

[75] Inventors: Jacques Lewiner, 5, rue Bory d'Arnex, 92210 Saint-Cloud; Claude Hennion, 14, rue de la Glacière, 75013 Paris; Eugeniusz Smycz, Saint-Cloud, all of France

[73] Assignees: Jacques Lewiner; Claude Hennion, both of France

[21] Appl. No.: 330,184

[22] Filed: Mar. 29, 1989

[30] Foreign Application Priority Data

Mar. 31, 1988 [FR] France ................. 88 04294

[51] Int. Cl.$^5$ ............................................. G05B 11/26
[52] U.S. Cl. ........................ 340/870.19; 340/870.16; 340/825.54; 340/825.06
[58] Field of Search ........... 340/870.16, 870.39, 340/825.06, 310 R, 870.19, 825.54; 371/24, 25, 28, 64, 71

[56] References Cited

U.S. PATENT DOCUMENTS

| | | | |
|---|---|---|---|
| 3,783,387 | 1/1974 | Wernli | 340/870.39 |
| 4,520,488 | 5/1985 | Houvig et al. | 340/870.39 |
| 4,806,905 | 2/1989 | McGowan, III et al. | 340/870.39 |

*Primary Examiner*—Donald J. Yusko
*Assistant Examiner*—Michael Horabik
*Attorney, Agent, or Firm*—Larson and Taylor

[57] ABSTRACT

The invention relates to an electronic circuit for remote interrogation of a receiver through a two wire line and to detect the response signals emitted by this receiver. The circuit comprises means for comparing with a reference voltage the actual voltage defining said response signals. This reference voltage is a weighted variable voltage obtained by low band-pass filtering, in a resistance-capacity circuit, of said actual voltage.

2 Claims, 1 Drawing Sheet

ELECTRONIC INTERROGATION CIRCUITS

The invention relates to electronic circuits designed to interrogate remote receivers by wire and to detect the signals emitted by these receivers in response to these interrogations.

These circuits are for example remote control and monitoring plants for coded locks.

The invention relates more particularly, among these circuits, to those which are connected to the receivers connected by two wires serving to conduct by themselves the electrical supply energy for the receivers, the coded interrogation signals and the coded response signals.

The coded response signals are constituted generally by sequences of voltage pulses and the amplitude of these pulses, when they arrive at the interrogation circuit, is all the weaker as the wires connecting this interrogation circuit to the receiver are longer.

In known embodiments, to avoid these pulses being confused with the inevitable interference, their amplitudes are compared with those of a fixed reference voltage.

Under certain circumstances, the amplitudes of said pulses vary over time, for example when certain contacts connected to the above wires are intermittent, as is the case for those which control the flashing of luminous indicators or the like or during certain adjustments involving current variations, or again on the creation of make or break current surges due to the starting or stopping of certain equipment.

The amplitude of certain of said pulses can then pass below the fixed reference level, which falsifies the decoding of the response signals and renders the unit inoperative.

It is a particular object of the invention to eliminate this drawback by enabling extremely sensitive and certain detection of the response signals concerned, even when the pulses which define them are associated with a supply voltage whose amplitude varies as a function of the current flowing in the wires.

To this end, electronic circuits of the type concerned according to the invention comprise also means for comparing with a reference voltage the actual voltage defining the response signals for detection purposes of said response signals and they are characterized in that this reference voltage is a weighted variable voltage obtained by low band-pass filtering of said actual voltage.

This low band-pass filtering is performed preferably by means of a resistance-capacity circuit whose time constant is comprised between T and 10T, where T denotes the shortest duration of the pulses and gaps between pulses defining the response signals.

The invention comprises, apart from these main features, certain other features which are preferably used at the same time and which will be more explicitly considered below.

In the following, an embodiment of the invention will be described with reference to the accompanying drawing given of course purely as non-limiting.

FIG. 1 of this drawing, shows very diagrammatically, an electronic interrogation circuit constructed according to the invention.

Figure 2:
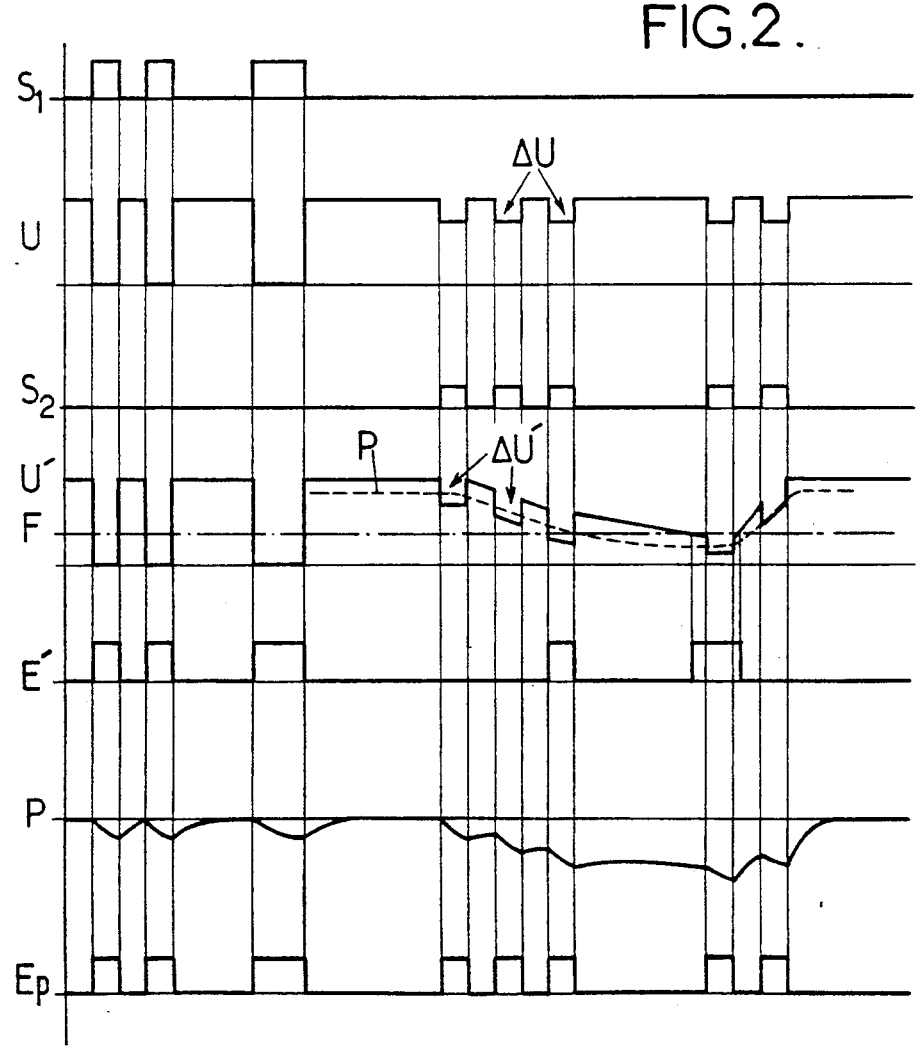

FIG. 2 is a graph showing the shape of the voltages developed at certain points in this circuit. In manner known in itself, the interrogation circuit concerned 1 is made to comprise:

- a D.C. current source 2 of which the two terminals are connected respectively, through two leads of which the first comprises a resistor 3, to two external connection points A and B,
- a unit or plant 4 comprising any desirable means for recording, for calculation, for forming and for emission of coded signals, as well as for reception and exploitation of other coded signals, and having an input E and an output S,
- a trigger composed of a transistor 5 and a resistor 6 connecting the output S to the two points A and B,
- and a comparator 7 whose output is connected to the input E of the unit or plant 4 and of which the two inputs are connected respectively to the point A and to a device adapted to form a reference voltage and which will be refered to below.

The circuit 1 concerned is designed for remote interrogation of at least one receiver 8 to which it is connected through a two wire line 9 which may be very long—its length can often reach several kilometers—and which can therefore have a relatively high resistance.

In practice, such circuits are, for example, used to ensure the coded remote control of locks, such as those equipping the rooms of a hotel, from a fixed station, with automatic display at the site of this station of the locked or unlocked state of each lock and/or of the open or closed state of each door equipped with a lock.

The operation of the unit is as follows. The plant 4 initially emits at its output S, for a first period corresponding to the left-hand portion of FIG. 2, a coded signal $S_1$ which has the effect of dropping to the rhythm of its code the D.C. supply voltage U present between the two wires 9.

After this first period, the plant 4 ceases to emit the coded signal $S_1$ and only the D.C. supply voltage U remains applied to the line 9.

The addressed message represented by the voltage U coded by the signal $S_1$ in the course of the first above period is detected by the different receivers 8 linked to the line 9.

It is assumed that the code recorded in the receiver 8 corresponds to the address of the above message: this receiver is arranged so that, just after reception of this message, it emits in its turn a coded response signal $S_2$ which takes into account said reception and preferably the execution of a mission associated with the message concerned, a mission such as the momentary unlocking of a lock.

This emission of the response signal $S_2$ extends over a second period corresponding to the right-hand portion of FIG. 2.

The potential difference caused by application of said signal $S_2$ to the line 9 is manifested between the points A and B by successive reductions $\Delta U$, of relatively low amplitude, of the D.C. voltage U, said reductions corresponding respectively to the different coding pulses composing the signal $S_2$.

It is the voltage U chopped up by these successive reductions $\Delta U$ which is compared for detection purposes with the reference voltage in the comparator 7.

In known embodiments said reference voltage is a fixed voltage F which is, for example, developed in the manner illustrated in chain or mixed lines in FIG. 1, that is to say by means of a voltage divider 10-11 connected to the terminals of the source 2.

The use of such a fixed reference has the drawback of lack of security. As a matter of fact, this fixed reference voltage must be both sufficiently different from the voltage U to eliminate undesirable interference and sufficiently close to the latter to permit detection of the smallest of the voltage reductions ΔU representing the response signal $S_2$ to be detected.

Now it may happen that certain of these reductions are so weak that their amplitude is less than the difference between the two amplitudes of the voltages U and F, so that these reductions escape from the detection performed by means of the comparator 7.

More precisely, if the total current in the line 9 remains constant, the form of the successive voltage reductions ΔU representing the voltage $S_2$ between the points A and B and of their carrier U is of the type seen on the first three lines of FIG. 2.

These forms lend themselves easily to detection by comparison of the notched or chopped voltage U with a fixed reference voltage whose amplitude F is suitably chosen, that is to say comprised between U and U-ΔU.

However if the total current in the line 9 varies, the form of the successive reductions of the voltage U representing the response signal $S_2$ and of their carrier U is of the type seen as ΔU' on the fourth line of FIG. 2.

Under these conditions, the comparison of the voltage reductions concerned ΔU' with a fixed reference value F permits the detection only of certain of these reductions: the only pulses detected by the above comparison and applied to the input E of the exchange 4 are those seen at E' in FIG. 2.

In other words, the voltage detected E does not correspond to the signal $S_2$ to be detected and the decoding of this signal $S_2$ is erroneous. The invention enables this drawback to be overcome by giving automatically to the reference voltage a weighted variable value P which takes automatically into account undesirable deformations imposed on the pulses representing the response signals $S_2$ and on their carrier in the course of their transfer between the receiver 8 and the points A and B.

This weighted reference voltage P is obtained according to the invention by low band-pass filtering of the actual voltage U' cut up or chopped by the successive reductions ΔU'.

This filtering is performed by means of a resistance 12-capacitance 13 circuit mounted in series between the points A and B and seen in solid line in FIG. 1: this resistance-capacitance circuit replaces here the voltage divider 10-11 of the prior art.

If T denotes the shortest time which separates two successive transitions of the pulses representing the coded response signal $S_2$, the time constant of the above filtering circuit is preferably comprised between T and 10T.

The weighted voltage P so obtained develops in short like the average value of the actual voltage U' cut up by the reductions ΔU'.

Its amplitude is hence automatically adapted to that of the current which flows in the line 9, or of the corresponding voltage U', being relatively low when disturbances of the voltage U'—due both to the reductions ΔU' and to the variations of the carrier U'—are relatively weak and on the contrary relatively high when said disturbances are relatively strong.

Due to the fact of this automatic adaptation at any moment of the reference threshold P to the actual overall amplitude of the reductions ΔU' to be detected, it is ensured that the detection carried out by comparing these reductions to this threshold and by only retaining those, of these reductions, which pass said threshold, enables the detection of the totality of the "reductions" concerned, that is to say even those which have the lowest overall amplitude.

The detected voltage $E_p$ resulting from this "weighted" comparison, which voltage is applied to the input E of the of the plant 4, then corresponds integrally to the response signal $S_2$ which it is desired to detect.

As a result of which, and whatever the embodiment adopted, there are finally provided electronic interrogation circuits whose constitution, operation and advantages (especially sensitivity and security of detection of the coded response signals) are sufficiently evident from the foregoing.

As is self-evident, and as results already besides from the foregoing, the invention is in no way limited to those of its types of application and embodiments which have been more especially envisaged; it encompasses, on the contrary, all modifications, especially:

those where circuits complementary to those described with reference to FIG. 1 would be added to the latter, such as an operational amplifier connected to the terminals of the resistor 3 and whose output would be connected to the input, of the comparator 7, other than that receiving the reference voltage, and those where the coupling between the plant 4 and the line 9 would be ensured by means other than the unit 5-6, for example, by a photocoupler enabling protection with respect to dangerous interference created on the line 9 of the electronic retrieval system for the response signals to be detected.

We claim:

1. Electronic circuit for remote interrogation of a receiver through a two wire line and for detecting the response signals emitted by this receiver, said circuit comprising low-band pass filtering means for low bandpass filtering the actual voltage defining said response signals to produce a reference voltage comprising a weighted variable voltage, and means for comparing said reference voltage with said actual voltage and for only retaining the portions of said actual voltage which exceed said reference voltage in a predetermined direction.

2. The electronic circuit according to claim 1, wherein the low band-pass filtering means comprises a resistance-capacitance circuit the time constant of which is comprised between T and 10T, where T denotes the shortest duration of the pulses and gaps between pulses defining the response signals.

* * * * *